Figure 1:
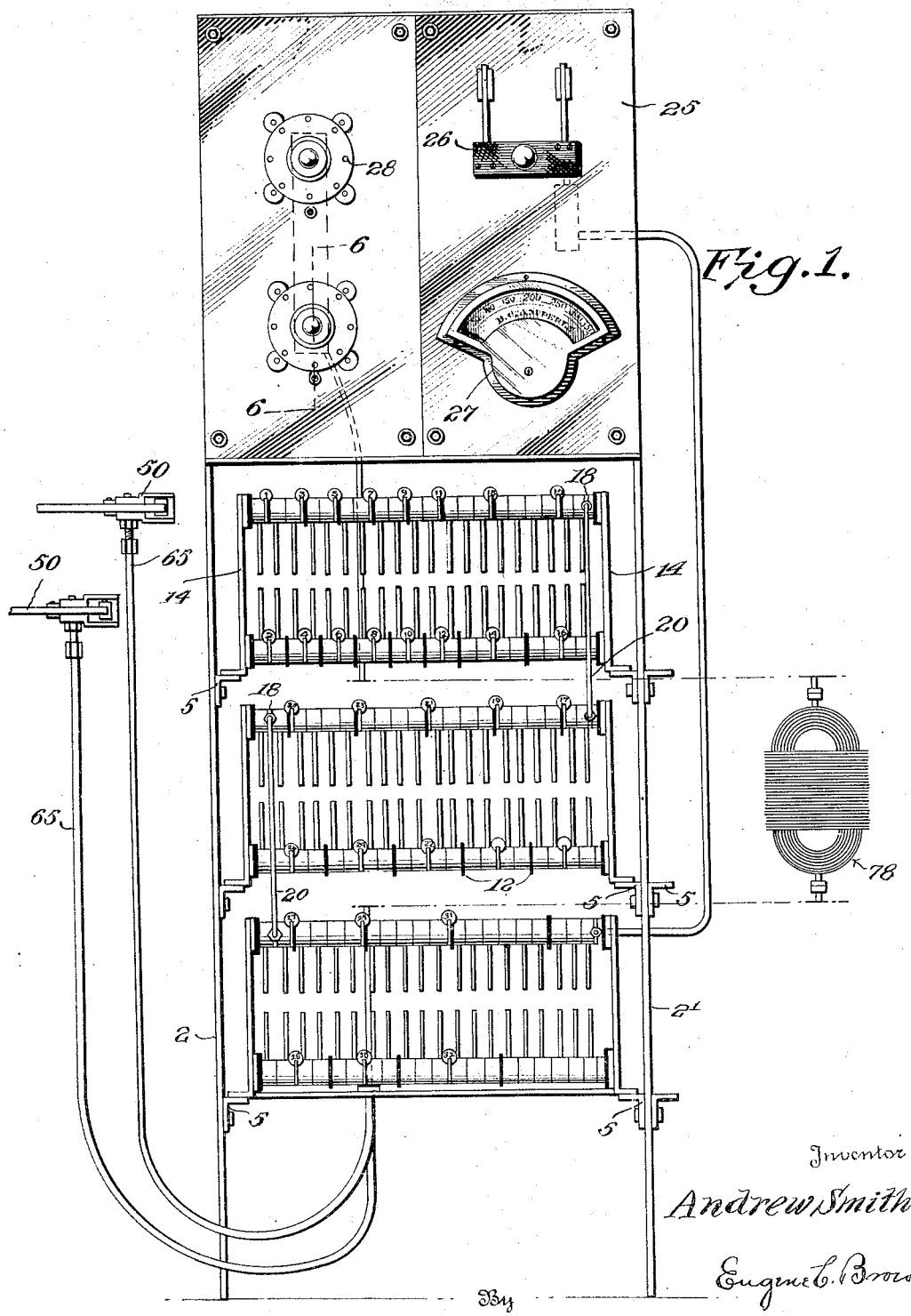

April 21, 1925. 1,534,288
A. SMITH
GRID RESISTANCE PANEL FOR ELECTRIC WELDING APPARATUS
Filed June 14, 1921 4 Sheets-Sheet 1

Inventor
Andrew Smith
By Eugene C. Brown
Attorney

April 21, 1925.
A. SMITH
1,534,288
GRID RESISTANCE PANEL FOR ELECTRIC WELDING APPARATUS
Filed June 14, 1921  4 Sheets-Sheet 2
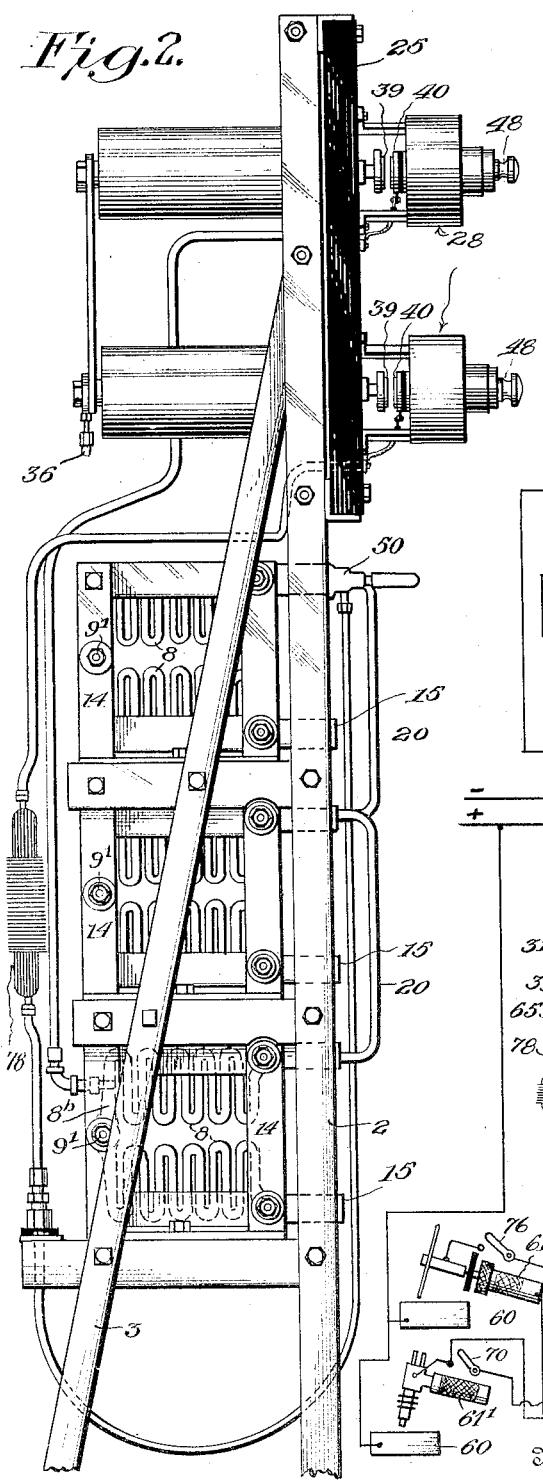
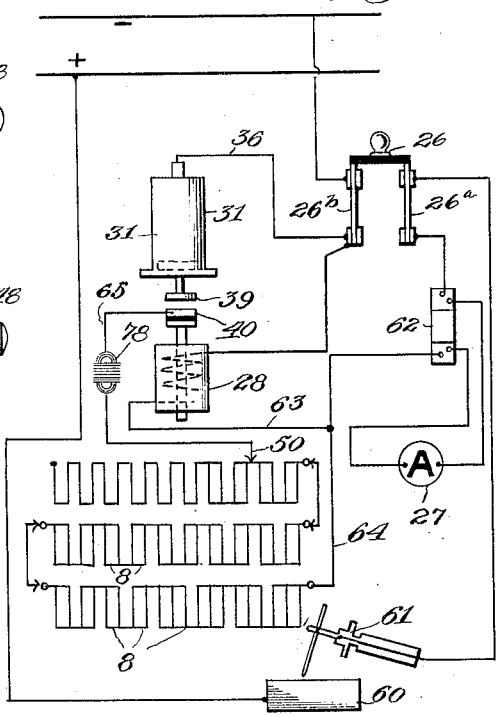
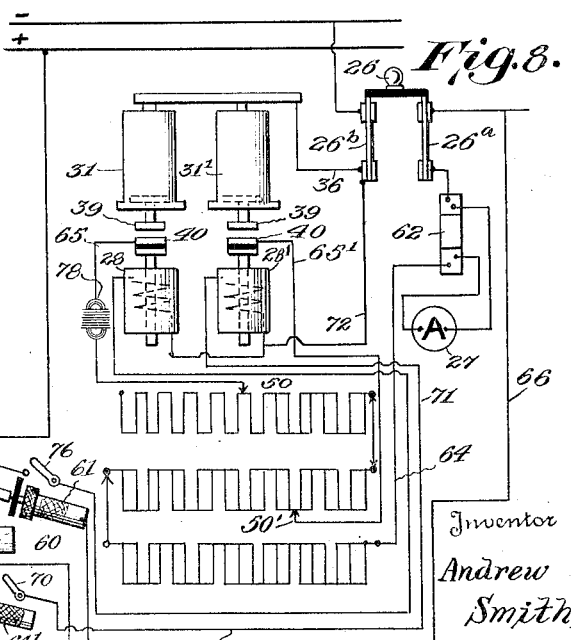
Inventor
Andrew Smith,
By Eugene C. Brown
Attorney April 21, 1925.  1,534,288
A. SMITH
GRID RESISTANCE PANEL FOR ELECTRIC WELDING APPARATUS
Filed June 14, 1921  4 Sheets-Sheet 3
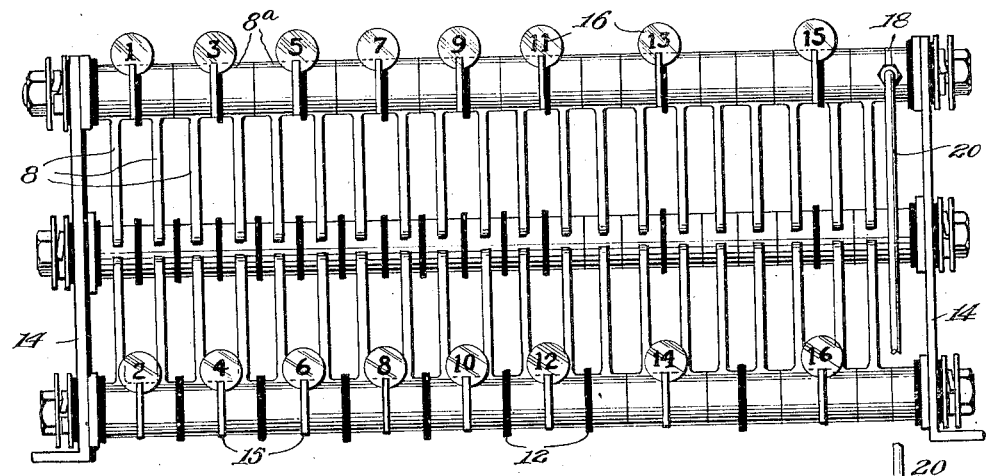
Inventor
Andrew Smith
By Eugene C. Brown
Attorney April 21, 1925.  1,534,288
A. SMITH
GRID RESISTANCE PANEL FOR ELECTRIC WELDING APPARATUS
Filed June 14, 1921  4 Sheets-Sheet 4

Inventor
Andrew Smith
By Eugene C. Brown
Attorney

Patented Apr. 21, 1925.

1,534,288

UNITED STATES PATENT OFFICE.

ANDREW SMITH, OF SAN MATEO, CALIFORNIA.

GRID-RESISTANCE PANEL FOR ELECTRIC WELDING APPARATUS.

Application filed June 14, 1921. Serial No. 477,417.

*To all whom it may concern:*

Be it known that I, ANDREW SMITH, a citizen of the United States, residing at San Mateo, in the county of San Mateo and State of California, have invented certain new and useful Improvements in Grid-Resistance Panels for Electric Welding Apparatus, of which the following is a specification.

My invention relates to resistance regulators for the circuits supplying current to electric arc welding apparatus.

In welding with the electric arc it is important that the welder be supplied with just the right current for the particular work at hand. This varies with the thickness of the metal, size of the sheets to be welded and with the temperature of the shop. When a number of welders are operating upon different pieces of work it is best to have one man in charge of the welding panels which contain the regulating resistances and he should be able to see at a glance what current is being supplied to each welder. When changes of current are required, necessitated by a change in the work, he should be able to supply the proper values instantly.

I prefer to employ resistance units formed of grids and to vary the resistance included in the circuit by connecting directly to different parts of the grid units. The usual method of arranging a grid resistance is to locate the grid sections or rheostats behind a switch-board and to connect the grids by cables to a number of switches on the switchboard. Such a system is complicated and in case of a defect or break down in any of the grids, it requires a long time to make the repairs. In my system the grids are incorporated in the panel boards and they are so arranged that any grid may be removed without disturbing the others. Connections are made directly to different parts of the grid by means of a portable clamp switch attached to a flexible cable.

Another feature of my welding resistance panel is the provision of means for reducing the current supplied to the arc as the latter is being broken. Heretofore it has been the custom to break the arc with the full welding current on and when the rush or surge of current occurred at the instant of the breaking of the arc, the metal was burnt and formed a crater. Naturally when a crater of burnt metal is locked into a weld, the joint is very materially weakened.

In the following detailed description I shall refer to the accompanying drawings, in which—

Figure 9:
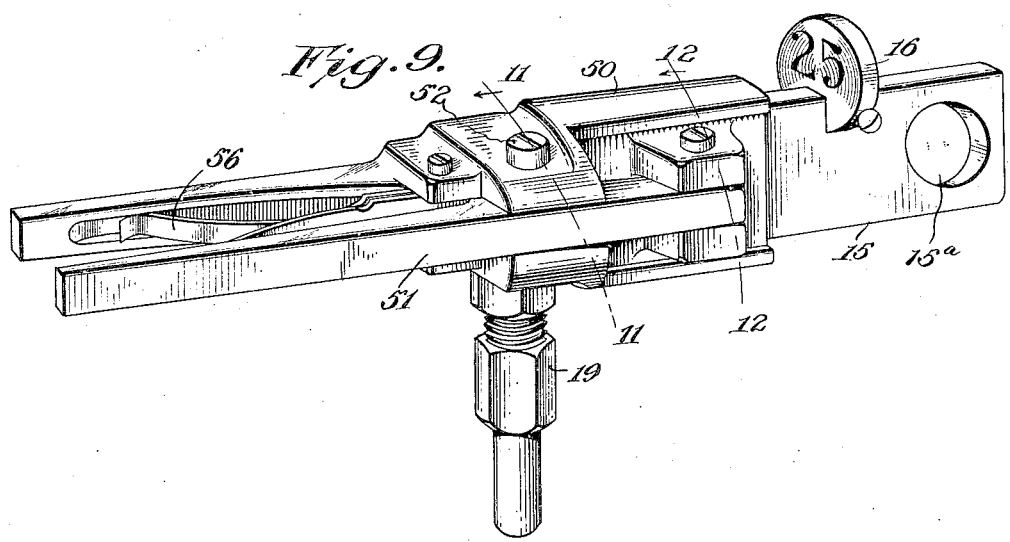
Figure 10:
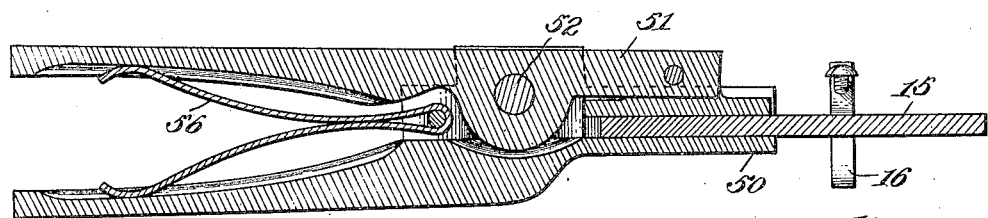
Figure 12:
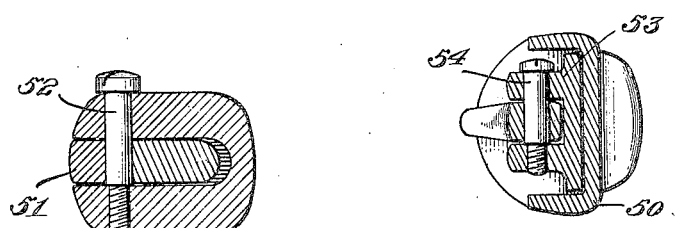
Figure 11:
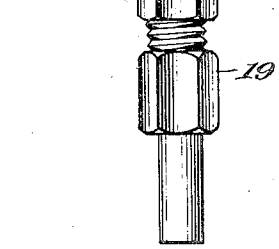

Figure 1 is a front elevation of a grid resistance regulating panel embodying the features of my invention; Fig. 2 is a side elevation thereof; Fig. 3 is an enlarged front elevation of one of the grid resistances; Figs. 4 and 5 are detailed sectional views of parts thereof; Fig. 6 is a vertical longitudinal sectional view on the line 6—6 of Fig. 1; Figs. 7 and 8 are diagrammatic views showing the manner of connecting the welding tools in circuit with the resistance panel; Fig. 9 is a perspective view of the portable clamp switch and showing the manner of connecting it to a grid contact; Fig. 10 is a central horizontal sectional view of the same; and Figs. 11 and 12 are transverse sectional views on the lines 11—11 and 12—12, respectively of Fig. 9.

Each panel of the switch board or regulating rheostat section is separately mounted independent of the others so that it can be immediately removed or replaced if necessary. As is well known, it is customary to stack one section upon another which necessitates the removal of all of the upper sections in order to remove a lower section.

Each panel is supported upon end frame standards 2, 2', and braces 3, to which the angle brackets 5 are bolted. The rheostats or resistance sections are formed in the usual manner, of a plurality of grids 8 by threading their perforated hubs $8^a$ upon supporting rods 9, and insulated therefrom by an interposed insulating sleeve 10. The upper and lower parts of each grid are connected by an intermediate part $8^b$ which may be provided with a hub threaded upon an insulated rod 9'. The rods are connected by end frame bars 14. The grids constituting the resistance elements are separated by insulating washers 12. For the purpose of making direct connection with any grid element, I interpose between the hubs $8^a$, contact washers or connectors 15, which are perforated, as indicated at $15^a$ in Fig. 9, so that they may be threaded upon the insulated rods. For the convenience of the attendant, these connector washers are provided with indicating tags 16 which are numbered consecutively for each panel. For the purpose of connecting the several rheostats in series, I provide at each end a washer 18, which carries a projecting connecting device 19, such as the well-known "Dossert" connector, to which the connecting rod or wire 20 is secured.

The upper part of the panel carries the main switch indicating instruments and automatic arc-controlling resistances which are mounted, as usual, upon slate slabs 25. For purposes of illustration, I have illustrated a simple manual switch 26, but it will be understood by engineers that a double pole, overload type may be employed. The ampere-meter 27 serves to indicate the location of the indicating instruments which preferably include a volt-meter, an ammeter and a recording volt-meter. The arc controlling resistances 28 are shown in detail in Fig. 6.

As above pointed out, it is important that the proper current should be supplied to the welder for the particular work at hand and it is also important to reduce the current at the arc just before it is broken to prevent the burning of the metal due to the rush or surge of current at the break. I provide for the automatic introduction of additional resistance just before the break of the arc by apparatus shown in Fig. 6. The resistance in the form of carbon pile disks 30 is housed in a casing 31 having an insulating lining and end wall 32. A plate 34 at the outer end is provided with a suitable connector 35 for attachment to a conductor 36. The plate 37 at the inner end is provided with a stem 38 which carries a contact block 39. The plate 37 is normally forced inwardly with a constant minimum pressure by a spring 41 which may be adjusted in tension by the nut 42. The contact block 40, which cooperates with the block 39, is carried by but insulated from the core plunger 45 of a solenoid magnet 46. When the magnet is deenergized the core is moved to the retracted position shown by a spring 47, the tension being adjustable by means of the screw 48. When the magnet coil 46 is energized the core moves the contact block 40 against the block 39 and then continues the pressure until the plate 37 compresses the carbon disks 30 sufficiently to reduce the resistance to the predetermined value. Upon deenergizing the magnet 46, the pressure exerted by the core 45 is relieved and the core is retracted by the spring 47. As the pressure on the carbon pile is being relieved, its resistance rapidly increases and if it were entirely withdrawn instantly and the contact blocks were simultaneously opened, the arc would be broken with full current and there would be a heavy surge of current which would burn the metal at the weld to a greater or less extent. This is what has commonly happened heretofore. To overcome this defect, I maintain the plate 37 under a constant minimum pressure by the spring 41, so that when the magnet 46 is deenergized and the core 45 is retracted, the contact blocks 39 and 40 are not instantly separated owing to the fact that the stem 38 carrying the block 39 is under initial spring pressure by the spring 41; and consequently the block 40 is held in contact with the block 39 for an instant after the plate 37 is under the control and pressure of the spring 41 and this minimum pressure is sufficient to permit the passage of say 15 amperes, the current through the arc being reduced from say 160 amperes to this minimum of 15 amperes before the separation of the blocks. Accordingly, when the blocks do separate there is only a comparatively small current flowing and no heavy surge of current will be produced. The importance of this automatic introduction of resistance and reduction of current before the separation of the switch contacts to prevent a surge of heavy current upon the breaking of the current will be appreciated by engineers and by practical welders.

In another respect, I have departed from prior practice, viz.: by making the connections directly to any desired grid corresponding with the resistance to be introduced into the welding circuit. As previously stated, the contacts are made by attaching a clamp switch to one of the contact washers 15 which project in the form of narrow plates. By connecting to successive contact washers the current may be varied, say from 50 amperes to 300 amperes. It is convenient to space the washers apart at different intervals. Thus the washers 1 to 12 may be spaced so that each one omitted will cause an increase of 5 amperes of current; from 13 to 28, a difference of 10 amperes each; and from 29 to 32, a difference of 15 amperes each.

I have devised a form of clamp switch illustrated in Figs. 9 to 12, which has proven to be very efficient and absolutely reliable. The stationary member is provided with a wide jaw 50 having a rectangular recess with flanges upon either side to receive the projecting plate portion of the contact washer 15, and with a depending connection, such as a "Dossert" connector 19 for attachment to a flexible cable. The movable member 51 is pivoted at 52 to the stationary member and carries upon its clamping end an oscillating jaw 53 pivoted on the bolt 54. The jaws are held with vise-like grip upon the contact plate by means of a strong spring 56 mounted between the handles.

The operation of the apparatus will be clear from the circuit diagrams illustrated in Figs. 7 and 8. Referring to Fig. 7 the device to be welded or work piece 60 is connected to the positive lead or supply conductor. With the parts connected as shown, the main switch 26 is closed, connecting the welding torch 61 to the negative lead or supply conductor through the switch blade 26ᵃ, ammeter shunt 62, conductor 63, coil of solenoid magnet 28 and switch blade 26ᵇ. By momentarily touching the rod of the torch to the work, the magnet is energized and closes the contact blocks 39 and 40 of the automatic switch. The full welding current will therefore flow from the positive lead through the work, across the arc to the torch, through switch blade 26ᵃ, reactance 78, conductor 64, rheostat grids, clamp switch 50, conductor 65, contact blocks 39 and 40, carbon pile resistance 31, conductor 36, and switch blade 26ᵇ to the negative supply lead.

It is frequently desirable to preheat the metal for the purpose of bringing the parts of the joint to a welding temperature before applying the welding torch. It is necessary to supply a much larger current to the preheating arc than is used for welding, the former requiring 300 or more amperes while the welding ordinarily requires about 125 amperes. In Fig. 8, I have shown the use of a preheating torch in conjunction with a welding torch. The preheating torch may be of the non-consuming water-cooled type disclosed in my Patent No. 1,298,590. Upon closing the torch switch 70 and momentarily touching the torch electrode to the work, a circuit is closed from the preheating torch 61' to the negative supply through conductor 71, the coil of switch magnet 28', conductor 72 and main switch blade 26ᵇ. Thereupon the switch contact blocks 39 and 40 are closed and a circuit is established from the negative supply lead, through switch blade 26ᵇ carbon pile 31', contact blocks 39 and 40, conductor 65', clamp switch 50', grid rheostat, conductor 64, switch blade 26ᵃ, and conductor 66 to the torch 61'. The magnet is designed to produce a compression on the carbon pile which permits a current of say 300 amperes to flow through the preheating arc. The resistance of the grid rheostat, which is preferably made of cast iron elements, increases when it becomes heated by the heavy flow of current and this causes a decrease of current. I overcome this objection to a large extent by employing carbon pile resistances in the current control apparatus, the latter decreasing in resistance as they become heated by the passage of the current, so that the increase in resistance of the iron grid is offset by the decrease in resistance of the carbon pile, thereby maintaining a substantially constant supply of current at the welding arc.

Upon the completion of the preheating stage, the circuit through the magnet coil of the automatic switch is broken by opening the switch 70. This causes the breaking of the main current at the contact blocks 39, 40 in the manner previously explained. By closing the switch 76 and momentarily touching the electrode of the welding torch 61 to the work 60, the magnet coil of the automatic switch 28 is energized, causing the contact blocks 39 and 40 to close a circuit to the welding torch through the carbon pile 31, conductor 65, reactance 78, grid rheostat, and conductors 64 and 66. When the weld is completed, the automatic switch is deenergized by opening the switch 76 and the current through the arc is first reduced and then broken in the manner described.

It is sometimes desirable to change the connection of the clamp switch 50 from one point to another on the grid resistance to suit changing conditions in the welding operation. In order that this may be accomplished without interruption, I divide the conductor 65 into two branches so that one clamp 50 may be attached to one contact plate 15 while the other is being shifted to the new position. I also find it desirable to insert a reactance coil 78 in the conductor 65 to prevent any sudden changes in the current flow.

I have illustrated grids of the cast iron type and while these are preferable, other types may be employed such as heavy coiled flat or round wire. Other materials may also be used which can be pressed into shape. So also it is possible to employ plug type switches instead of the clamp switches. These various modifications are evidently within the scope of my claims.

I claim:—

1. Arc-welding apparatus including a portable terminal or welding tool, an arc-controller in circuit therewith comprising a compressible resistance including a plunger maintained under a minimum yieldable pressure, said plunger carrying a contact, an electro-magnet having a movable core carrying a contact to cooperate with said first-named contact and means to energize said electro-magnet to cause said core to first bring said contacts into engagement and then force said plunger against said resistance with a predetermined pressure to thereby permit the flow of a certain current to the arc.

2. Arc-welding apparatus for controlling the current supplied to the arc, comprising a carbon pile or the like resistance having a compressing plunger at one end carrying a contact block, yielding means for normally maintaining a minimum pressure upon said plunger, an electro-magnet having an armature or core carrying a cooperating contact block, said magnet when energized causing said contacts to engage and then placing a predetermined pressure upon said plunger to thereby determine the electrical resistance of said pile, said minimum pressure means establishing a definite resistance through the pile upon the deenergizing of said magnet and which reduces the current through the arc just prior to the breaking of the circuit at said contacts.

3. Arc-welding apparatus for controlling the current supplied to the arc, comprising a carbon pile or the like resistance, an electro-magnetic device operating to place said pile under the desired pressure and to close the welding circuit, and means for causing a predetermined minimum pressure upon the pile after said device is deenergized and just prior to the breaking of the circuit.

4. Arc-welding apparatus comprising means for preheating the metal at the weld by an arc of a predetermined amperage, means for effecting the weld by an arc of lower amperage, and means for breaking the circuit of the welding arc including means for automatically reducing the amperage just prior to the breaking of the arc.

5. Arc-welding apparatus for controlling the current supplied to the arc, comprising a series of grid resistance elements the resistance of which increases with increasing temperature, and a controlling resistance in series therewith which decreases in resistance with increasing temperture.

In testimony whereof I affix my signature.

ANDREW SMITH.